United States Patent
Wang et al.

(10) Patent No.: US 11,624,840 B2
(45) Date of Patent: Apr. 11, 2023

(54) SYSTEM AND METHOD FOR GLOBAL NAVIGATION SATELLITE SYSTEM (GNSS) OUTLIER DETECTION AND REJECTION AND APPLICATION OF SAME

(71) Applicant: Guangzhou Xiaopeng Autopilot Technology Co., Ltd., Guangdong (CN)

(72) Inventors: Pengluo Wang, San Diego, CA (US); Hairuo Zhuang, San Diego, CA (US); Venkatesan Nallampatti Ekambaram, San Diego, CA (US)

(73) Assignee: GUANGZHOU XIAOPENG AUTOPILOT TECHNOLOGY CO., LTD., Guangdong (CN)

( * ) Notice: Subject to any disclaimer, the term of this patent is extended or adjusted under 35 U.S.C. 154(b) by 57 days.

(21) Appl. No.: 17/363,405

(22) Filed: Jun. 30, 2021

(65) Prior Publication Data
US 2023/0003898 A1    Jan. 5, 2023

(51) Int. Cl.
*G01S 19/20* (2010.01)
*G01S 19/39* (2010.01)
*G01S 19/29* (2010.01)

(52) U.S. Cl.
CPC .............. *G01S 19/20* (2013.01); *G01S 19/29* (2013.01); *G01S 19/396* (2019.08)

(58) Field of Classification Search
CPC ... G01S 19/20–22; G01S 19/29; G01S 19/396
See application file for complete search history.

(56) References Cited

U.S. PATENT DOCUMENTS

| | | | | |
|---|---|---|---|---|
| 5,808,581 A | * | 9/1998 | Braisted | G01S 19/20 701/503 |
| 7,583,769 B2 | * | 9/2009 | Twitchell, Jr. | G01S 19/215 375/349 |
| 7,821,454 B2 | * | 10/2010 | Xie | G01S 19/20 342/357.58 |
| 8,106,823 B2 | * | 1/2012 | Schroth | G01S 19/20 342/357.67 |
| 10,094,931 B2 | * | 10/2018 | Lennen | G01S 19/23 |
| 2012/0319898 A1 | * | 12/2012 | Tominaga | G01S 19/30 342/357.61 |

\* cited by examiner

*Primary Examiner* — Cassi J Galt
(74) *Attorney, Agent, or Firm* — Locke Lord LLP; Tim Tingkang Xia, Esq.

(57) ABSTRACT

A Global Navigation Satellite System (GNSS) receiver for performing GNSS outlier detection and rejection is provided. When the GNSS receiver receives GNSS signals from satellites in the GNSS, the GNSS receiver processes the GNSS signals to perform positioning. Then, the GNSS receiver sequentially performs a Doppler-pseudorange comparison, a Random Sampling Consensus (RANSAC) check for selected subsets of the satellites, and a history-based check for the satellites to determine a status of each satellites as an outlier or an inlier. Specifically, in the RANSAC check, the subsets of the satellites are selected using results of the Doppler-pseudorange comparison as inputs to filter the satellites, thus reducing the number of subsets needed for computation in the RANSAC check. The status of the satellites are recorded for the history-based check, which further exploits the correlations of outliers across time.

20 Claims, 9 Drawing Sheets

SYSTEM AND METHOD FOR GLOBAL NAVIGATION SATELLITE SYSTEM (GNSS) OUTLIER DETECTION AND REJECTION AND APPLICATION OF SAME

FIELD OF THE INVENTION

The present invention relates generally to satellite navigation technology, and more particularly to a system and method for Global Navigation Satellite System (GNSS) outlier detection and rejection, and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

The Global Navigation Satellite System (GNSS) is an essential part for obtaining accurate global positioning, and is widely used for vehicle localization purposes. In some cases, typical GNSS Extended Kalman Filters (EKF's) provide standard outlier algorithms to detect outliers in the GNSS pseudorange measurements. However, each of these standard algorithms may have its own deficiencies, as some of the standard algorithms may be inaccurate, and some other standard algorithms may be too complex and not efficient.

Therefore, a heretofore unaddressed need exists in the art to address the aforementioned deficiencies and inadequacies.

SUMMARY OF THE INVENTION

The present invention relates to a system and method for Global Navigation Satellite System (GNSS) outlier detection and rejection, and application of the same. Specifically, the system and method utilizes an integration of multiple outlier algorithms in sequence, in which Doppler-pseudorange comparison and Random Sampling Consensus (RANSAC) and history-based checks are sequentially performed, where the RANSAC check takes the filtered output from the Doppler-pseudorange comparison as the input, thus reducing the number of subsets needed for computation in the RANSAC check.

In one aspect of the invention, a GNSS receiver for performing GNSS outlier detection and rejection is provided. In certain embodiments, the GNSS receiver includes a receiving device communicatively connected to a plurality of satellites in the GNSS, configured to receive GNSS signals from the satellites; and a computing device having a processor and a storage device storing computer executable instructions. The computer executable instructions, when executed on the processor, cause the processor to: process the GNSS signals received from the satellites to perform positioning; perform a Doppler-pseudorange comparison for each of the satellites in the GNSS to determine a status of each of the satellites as an outlier or undetermined; after performing the Doppler-pseudorange comparison, perform a Random Sampling Consensus (RANSAC) check for selected subsets of the satellites using results of the Doppler-pseudorange comparison as inputs to filter the satellites, and to determine the status of each of the selected subsets as the outlier or undetermined; after performing the RANSAC check, in response to determining the status of a specific satellite of the satellites as undetermined in the Doppler-pseudorange comparison or the RANSAC check, perform a history-based check for the specific satellite to determine the status of the specific satellite as the outlier or an inlier; and record, in a state table, the status of each of the satellites.

In another aspect of the present invention, a method for performing GNSS outlier detection and rejection includes: providing a GNSS receiver communicatively connected to a plurality of satellites in the GNSS, wherein the GNSS receiver is configured to receive GNSS signals from the satellites and process the GNSS signals to perform positioning; performing, by the GNSS receiver, a Doppler-pseudorange comparison for each of the satellites in the GNSS to determine a status of each of the satellites as an outlier or undetermined; after performing the Doppler-pseudorange comparison, performing, by the GNSS receiver, a Random Sampling Consensus (RANSAC) check for selected subsets of the satellites using results of the Doppler-pseudorange comparison as inputs to filter the satellites, and to determine the status of each of the selected subsets as the outlier or undetermined; after performing the RANSAC check, in response to determining the status of a specific satellite of the satellites as undetermined in the Doppler-pseudorange comparison or the RANSAC check, performing, by the GNSS receiver, a history-based check for the specific satellite to determine the status of the specific satellite as the outlier or an inlier; and recording, by the GNSS receiver in a state table, the status of each of the satellites.

Yet another aspect of the present invention relates to non-transitory tangible computer-readable medium storing computer executable instructions which, when executed by one or more processors on a GNSS receiver, cause the method as discussed to be performed.

In one embodiment, for a designated satellite of the satellites, the Doppler-pseudorange comparison is performed by: performing a Doppler measurement based on the GNSS signals received from the designated satellite; calculating a pseudorange change rate for the designated satellite; and determining the status of the designated satellite by comparing the Doppler measurement and the pseudorange change rate, wherein the status of the designated satellite is determined as the outlier when the Doppler measurement and the pseudorange change rate are determined to be inconsistent with each other. In one embodiment, the Doppler measurement and the pseudorange change rate are determined to be inconsistent when an error rate of the Doppler measurement and the pseudorange change rate exceeds a threshold.

In one embodiment, the RANSAC check is performed by: assigning a weight $W_i$ for each the satellites based on the results of the Doppler-pseudorange comparison; obtaining a probability distribution by normalizing the weights $\{W_i\}$ for all of the satellites; selecting the subsets from the satellites randomly based on the normalizing weights for the satellites; and determining, using RANSAC, the status of each of the selected subsets as the outlier or undetermined. In one embodiment, the weight $W_i$ for each the satellites is determined based on an error rate of the Doppler measurement and the pseudorange change rate.

In one embodiment, the history-based check is performed by: determining a past time period for the history-based check; checking the state table for the specific satellite within the past time period to determine the recorded status of the specific satellite within the past time period; and determining the status of the specific satellite based on the recorded status of the specific satellite within the past time period, wherein the status of the specific satellite is determined as the outlier when any of the recorded status of the specific satellite within the past time period is the outlier, and the status of the specific satellite is determined as the inlier when none of the recorded status of the specific satellite within the past time period is the outlier. In one embodiment, the past time period is variable based on a location of the GNSS receiver.

In one embodiment, the computer executable instructions, when executed on the processor, further cause the processor to, prior to performing the RANSAC check, perform a signal-to-noise ratio (SNR) check for each of the satellites in the GNSS to determine the status of each of the satellites as the outlier or undetermined, wherein the RANSAC check uses both the results of the Doppler-pseudorange comparison and results of the SNR check as the inputs to filter the satellites.

Yet a further aspect of the invention relates to a vehicle having the GNSS receiver as described above.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

As discussed above, each of the standard outlier algorithms for detecting outliers in the GNSS may have its own deficiencies. For example, standard algorithms using signal-to-noise ratios (SNR's) or Doopler-velocity rejections may be simple but relatively inaccurate. In comparison, Random Sampling Consensus (RANSAC) algorithms, while being more accurate, require significantly complex computation to obtain the result, and is thus not efficient.

To address the aforementioned issues, certain aspects of the present invention relate to a system and method for Global Navigation Satellite System (GNSS) outlier detection and rejection, which utilizes an integration of multiple outlier algorithms in sequence. For example, in certain embodiments, the GNSS receiver sequentially performs Doppler-pseudorange comparison and Random Sampling Consensus (RANSAC) and history-based checks, where the RANSAC check takes the filtered output from the Doppler-pseudorange comparison as the input, thus reducing the number of subsets needed for computation in the RANSAC check. The status of the satellites are recorded for the history-based check, which further exploits the correlations of outliers across time.

Figure 1:
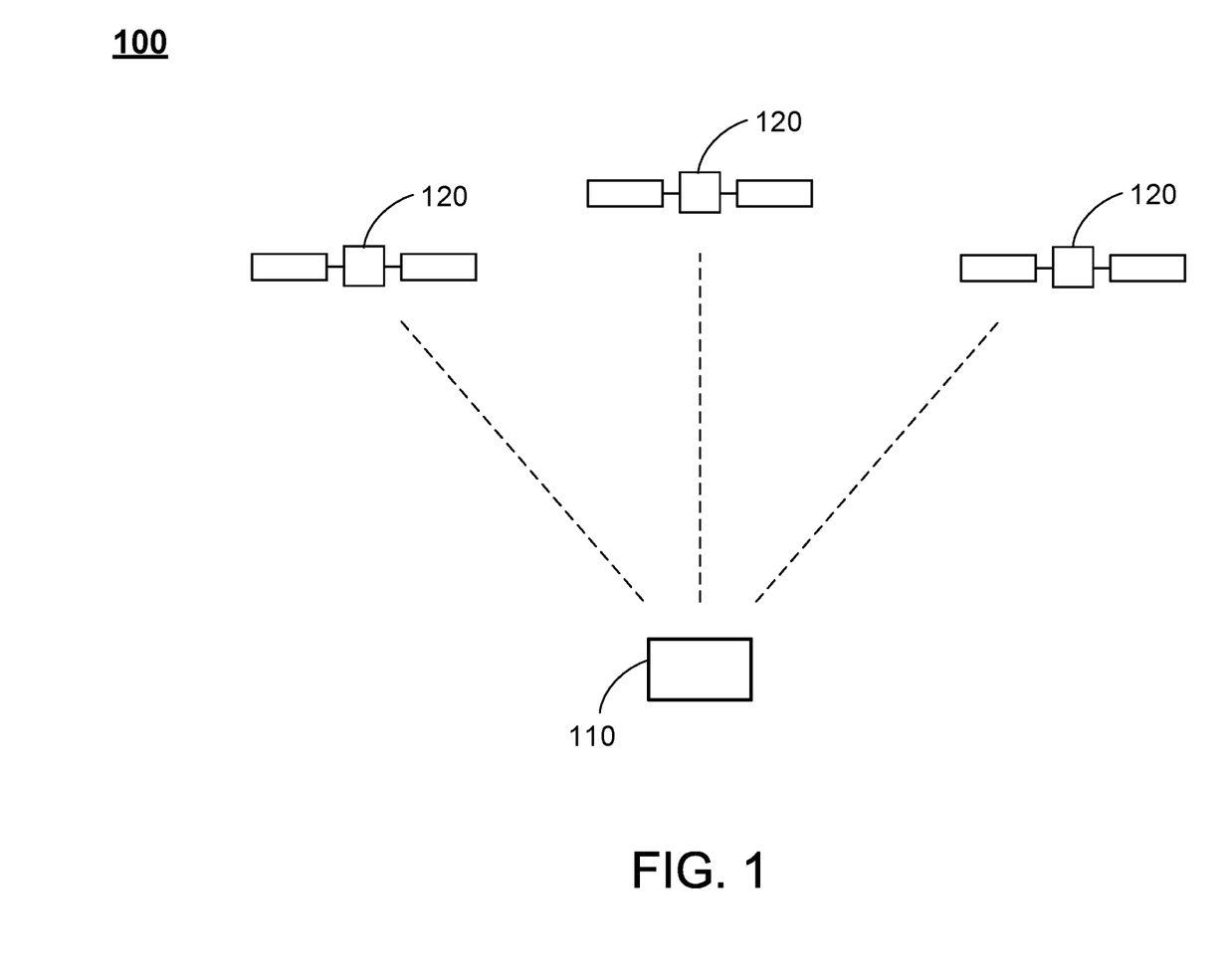
FIG. 1 shows schematically an overall architecture of a Global Navigation Satellite System (GNSS) according to one embodiment of the invention.

One aspect of the invention relates to a Global Navigation Satellite System (GNSS) receiver for performing GNSS outlier detection and rejection. FIG. 1 shows schematically an overall architecture of a GNSS according to one embodiment of the invention. As shown in FIG. 1, the GNSS 100 includes a GNSS receiver 110 and a plurality of satellites 120. Specifically, the GNSS receiver 110 may be a receiving device communicatively connected to the satellites 120, such that the GNSS receiver 110 may receive GNSS signals from the satellites 120. In certain embodiments, the GNSS receiver 110 may be an in-vehicle device installed or mounted in a vehicle, which may be a car, a motorcycle, a plane, a ship, a rover or other types of vehicles that require positioning or localization functions. Further, the GNSS receiver 110 also includes a computing device to process the GNSS signals received from the satellites 120 and to perform GNSS outlier detection and rejection. In certain embodiment, the computing device may be an in-vehicle computer, such as the built-in electronic control unit (ECU) of the vehicle. Alternatively, in certain embodiments, the computing device may be an individual computing device or control unit of the GNSS receiver 110, which runs independently and separately from the existing ECU of the vehicle. In certain embodiments, the computing device may be a general purpose computer being provided with the necessary hardware and/or software components to perform object detection, or may be a specialized computer or controller specifically designed and configured to perform object detection.

Figure 2A:
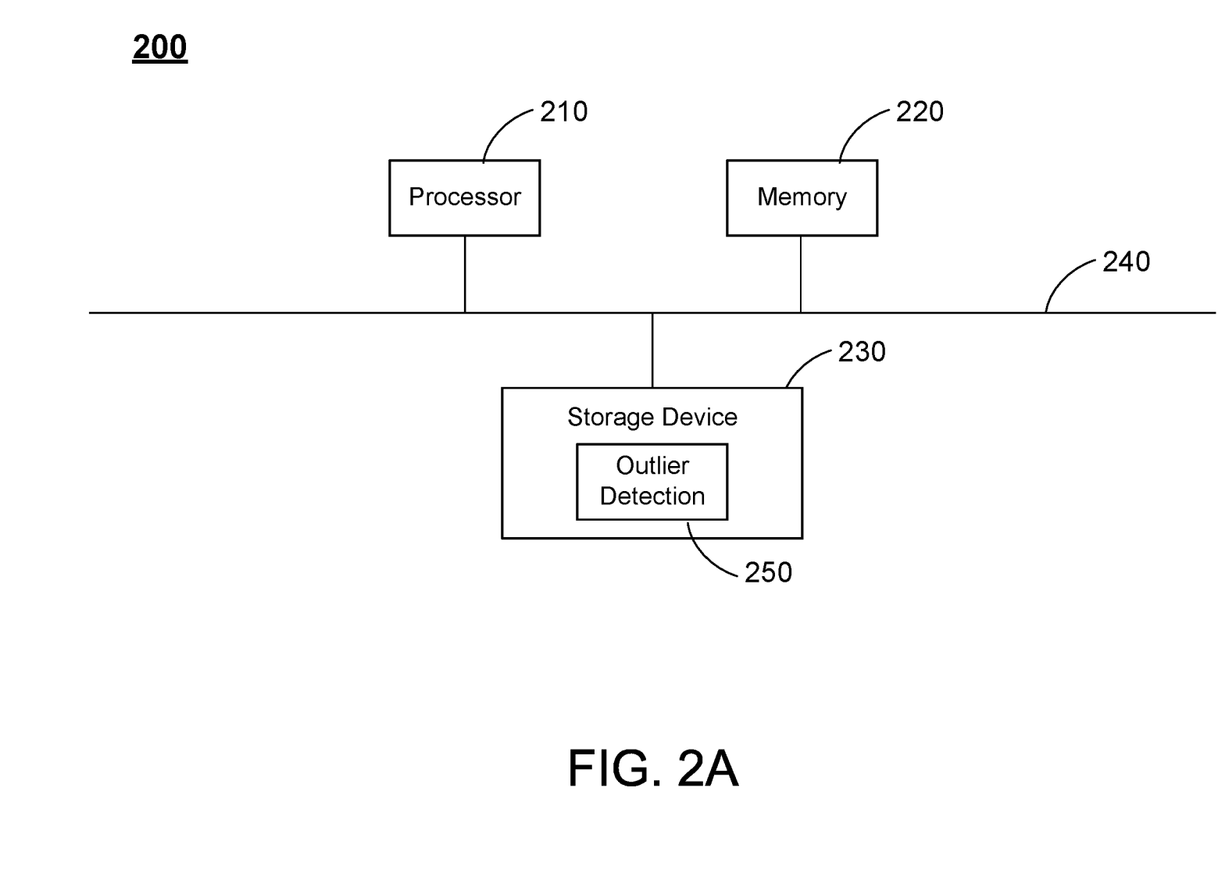
FIG. 2A shows schematically a computing device of the GNSS receiver according to one embodiment of the invention.

FIG. 2A shows schematically a computing device according to one embodiment of the invention. Specifically, the computing device 200 as shown in FIG. 2A is used as the computing device of the GNSS receiver 110 as shown in FIG. 1. As shown in FIG. 2A, the computing device 200 includes a processor 210, a memory 220, and a storage device 230, and a bus 240 interconnecting the processor 210, the memory 220 and the storage device 230. In certain embodiments, the computing device 200 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The processor 210 controls operation of the computing device 200, which may be used to execute any computer executable code or instructions. In certain embodiments, the processor 210 may be a central processing unit (CPU), and the computer executable code or instructions being executed by the processor 210 may include an operating system (OS) and other applications, codes or instructions stored in the computing device 200. In certain embodiments, the computing device 200 may run on multiple processors, which may include any suitable number of processors.

The memory 220 may be a volatile memory module, such as the random-access memory (RAM), for storing the data and information during the operation of the computing device 200. In certain embodiments, the memory 220 may be in the form of a volatile memory array. In certain embodiments, the computing device 200 may run on more than one memory 220.

The storage device 230 is a non-volatile storage media or device for storing the computer executable code or instructions, such as the OS and the software applications for the computing device 200. Examples of the storage device 230 may include flash memory, memory cards, USB drives, or other types of non-volatile storage devices such as hard drives, floppy disks, optical drives, or any other types of data storage devices. In certain embodiments, the computing device 200 may have more than one storage device 230, and the software applications of the computing device 200 may be stored in the more than one storage device 230 separately.

Figure 2B:
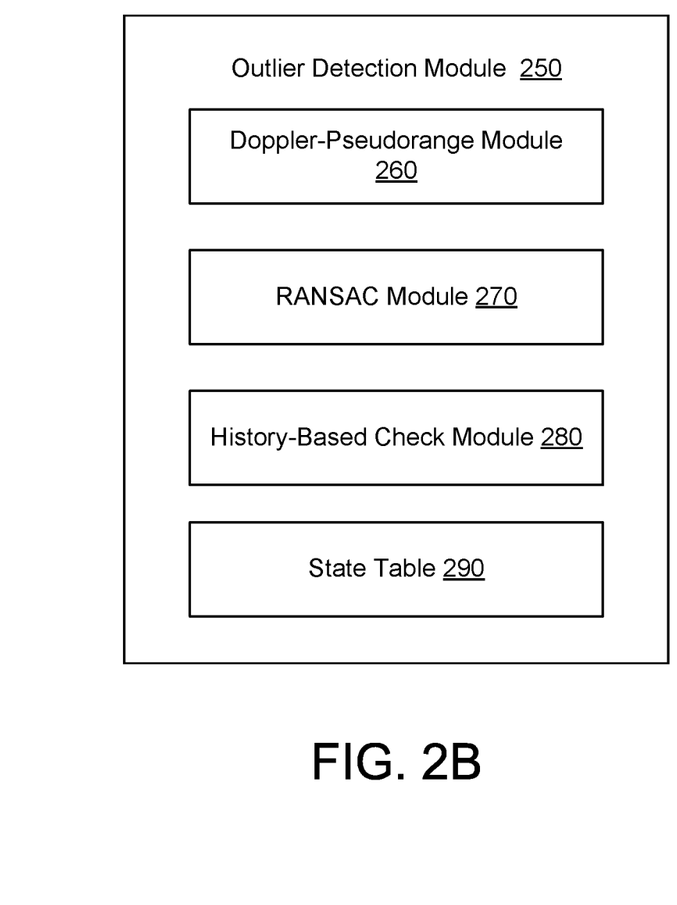
FIG. 2B shows schematically an outlier detection module in the computing device as shown in FIG. 2A according to one embodiment of the invention.

As shown in FIG. 2A, the computer executable code stored in the storage device 230 may include an outlier detection module 250. Specifically, the outlier detection module 250 is a software module which, when executed, provides the outlier detection functions for performing the GNSS outlier detection and rejection process. FIG. 2B shows schematically an outlier detection module in the computing device as shown in FIG. 2A according to one embodiment of the invention. Specifically, the outlier detection module 250 as shown in FIG. 2B includes a Doppler-pseudorange module 260, a RANSAC module 270, and a history-based check module 280. Further, a state table 290 is provided to store and record the status of the satellites being detected. Specifically, for each of the satellites in a GNSS, the status of the satellite may be detected as an outlier or an inlier, and the status as detected may be stored in the state table 290.

The Doppler-pseudorange module 260 is used to perform a Doppler-pseudorange comparison for each of the satellites in the GNSS. Specifically, Doppler measurements may be in the form of a function of the radial velocity between the rover (or the vehicle on which the GNSS receiver 200 is provided) and a corresponding one the satellites. Similarly, the pseudorange change rate also reflects the velocity between the rover and the corresponding satellite if we neglect the position changes of the satellites. Theoretically, the relationship between the theoretical Doppler observation (Dop) and the pseudorange change rate is:

$$Dop = \Delta Pr / \lambda \qquad (1)$$

where $\Delta Pr$ is the pseudorange change rate, and $\lambda$ is the wavelength of the signals.

Since the actual Doppler measurement may be different from the theoretical value of the Dop calculated by the above equation, it would be possible to use the comparison between the Doppler measurement and the pseudorange change rate to determine whether the status of a satellite is an outlier or not. For example, by setting up a threshold of the error rate of the Doppler measurement and the pseudorange change rate, it may be possible to determine whether the Doppler measurement and the pseudorange change rate are consistent with each other or not. For example, in the case where the error rate of the Doppler measurement and the pseudorange change rate exceeds the threshold, the Doppler measurement and the pseudorange change rate are determined to be inconsistent with each other, and the status of the satellite is determined as the outlier. On the other hand, when the error rate of the Doppler measurement and the pseudorange change rate does not exceed the threshold, the Doppler measurement and the pseudorange change rate are determined to be consistent with each other, and the status of the satellite is undetermined, as it may go through additional RANSAC and/or history-based checks to determine whether the satellite is an inlier.

Figure 3:
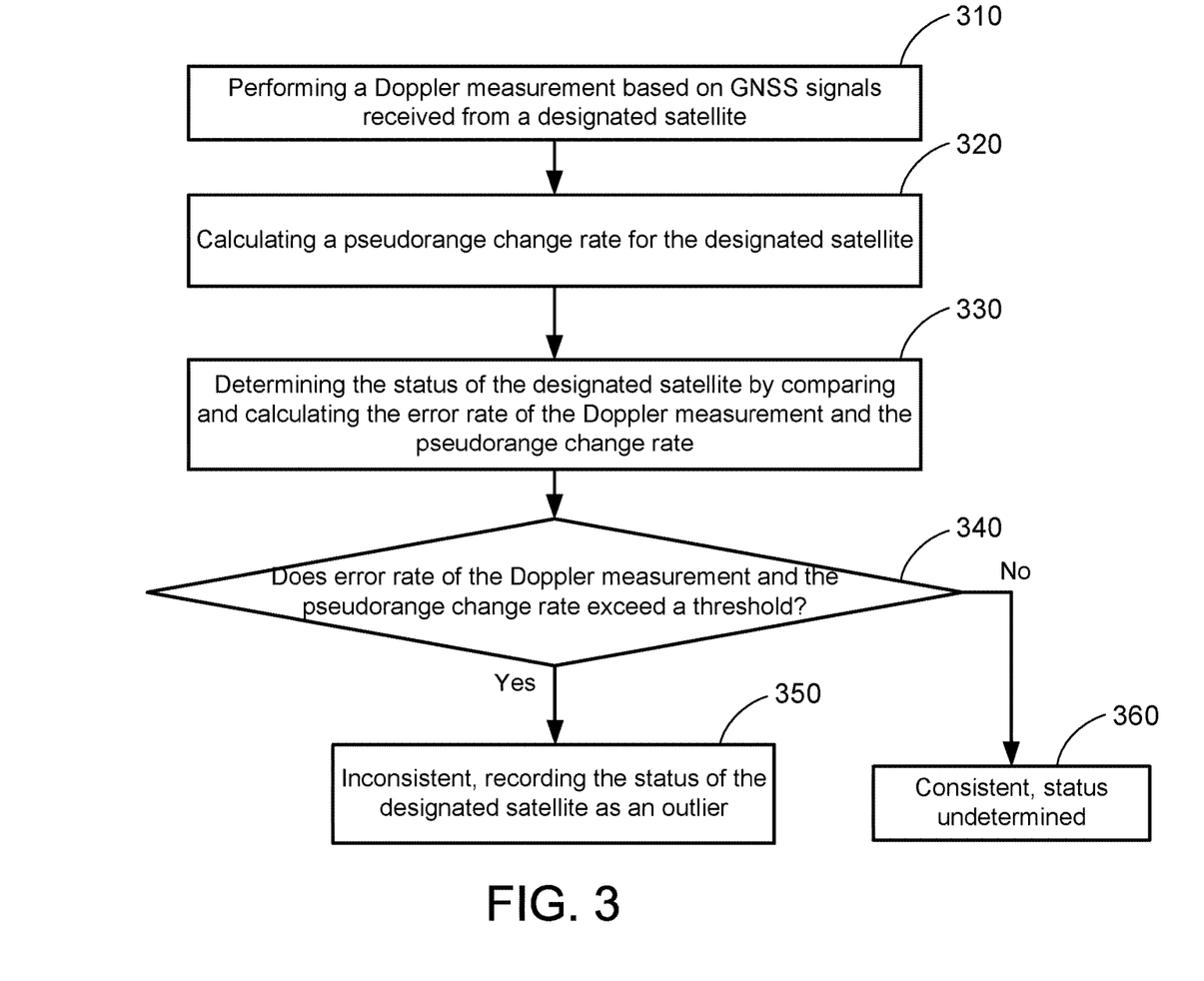
FIG. 3 shows a flowchart of the Doppler-pseudorange comparison performed by the Doppler-pseudorange module as shown in FIG. 2B according to one embodiment of the invention.

FIG. 3 shows a flowchart of the Doppler-pseudorange comparison performed by the Doppler-pseudorange module 260 as shown in FIG. 2B according to one embodiment of the invention. Specifically, FIG. 3 shows the Doppler-pseudorange comparison performed on a designated satellite in the GNSS. It should be noted that, unless otherwise stated in the present disclosure, the steps of the flowchart as shown in FIG. 3 may be arranged in a different sequential order, and are thus not limited to the sequential order as shown in FIG. 3.

As shown in FIG. 3, in the operation of the Doppler-pseudorange module 260, at the process 310, a Doppler measurement is performed based on the GNSS signals received from the designated satellite. Then, at the process 320, a pseudorange change rate is calculated for the designated satellite. Once the Doppler measurement and the pseudorange change rate are obtained, at the process 330, the status of the designated satellite may be determined by comparing and calculating the error rate of the Doppler measurement and the pseudorange change rate. At the process 340, a determination as to whether the error rate of the Doppler measurement and the pseudorange change rate exceeds the threshold is performed. If it is determined that the error rate of the Doppler measurement and the pseudorange change rate exceeds the threshold, the Doppler measurement and the pseudorange change rate are determined to be inconsistent with each other, and the status of the designated satellite is determined as an outlier. Thus, at the process 350, the status of the designated satellite is recorded as an outlier. On the other hand, if it is determined that the error rate of the Doppler measurement and the pseudorange change rate does not exceed the threshold, the Doppler measurement and the pseudorange change rate are determined to be consistent with each other, and it is possible that the designated satellite may be an inlier. At the process 360, the status of the designated satellite remains undetermined, pending further determination by the RANSAC module 270 and/or the history-based module 280.

The RANSAC module 270 is used to perform a RANSAC check for a plurality of subsets randomly selected from the satellites. Specifically, the RANSAC check is performed after the Doppler-pseudorange comparison, in which the results of the Doppler-pseudorange comparison as inputs for the RANSAC check to filter the satellites. Specifically, RANSAC is a computational power consuming process, and the most computationally intensive step in RANSAC is iterating through the multiple subsets. Due to the availability of computational resources, there is a need to restrict the number of subsets depending on the available resources. However, such restriction is a tradeoff with the performance, as additional subsets being selected may improve the performance for a given computational complexity of the RANSAC algorithm. Therefore, there must be some intelligent choice of the subsets from all of the satellites for the balance between the performance and efficiency of the RANSAC module 270.

In certain embodiments, the Doppler-pseudorange comparison places a confidence on each of the pseudorange measurements for the satellites, as the results of the Doppler-pseudorange comparison (e.g., the error rate of the Doppler measurement and the pseudorange change rate) is an indicative factor to the selection of the subsets. In one embodiment, depending on the consistency of the results of the Doppler-pseudorange comparison for each of the satellites, a weight $W_i$ may be assigned to the corresponding the pseudorange measurements $\rho_i$ for each of the satellites, where a larger weight indicates a higher confidence on the measurement. For example, for each satellite, the weight could be an inverse of the error rate between the Doppler measurement and the pseudorange change rate. In this case, for the satellites being determined as the outliers in the Doppler-pseudorange comparison, the corresponding weight W will be relatively small, and for the satellites with their status being undetermined in the Doppler-pseudorange comparison, the corresponding weight W will be relatively large. In one embodiments, for N satellites, the weights can be further normalized to obtain a probability distribution $\{W_i\}$ over the pseudorange measurements, where N is a positive integer, and i=1, 2, . . . , N. In this case, the normalized weight may be $\{W_1, W_2, \ldots, W_N\}$. Then, in the subset selection step of RANSAC, the random subsets can be selected or sampled based on the probability mass function as defined by the weights above. For example, if the RANSAC algorithm allows selecting M subsets from the N satellites, where M is a positive integer not greater than N, the selection result would likely be the M most likely inlier sets based on the Doppler rejection metric. In other words, the application of the weights increases the likelihood of selecting the correct inlier subsets in the RANSAC checking process, and the number of subsets that need to be computed in the RANSAC checking process is reduced.

Figure 4A:
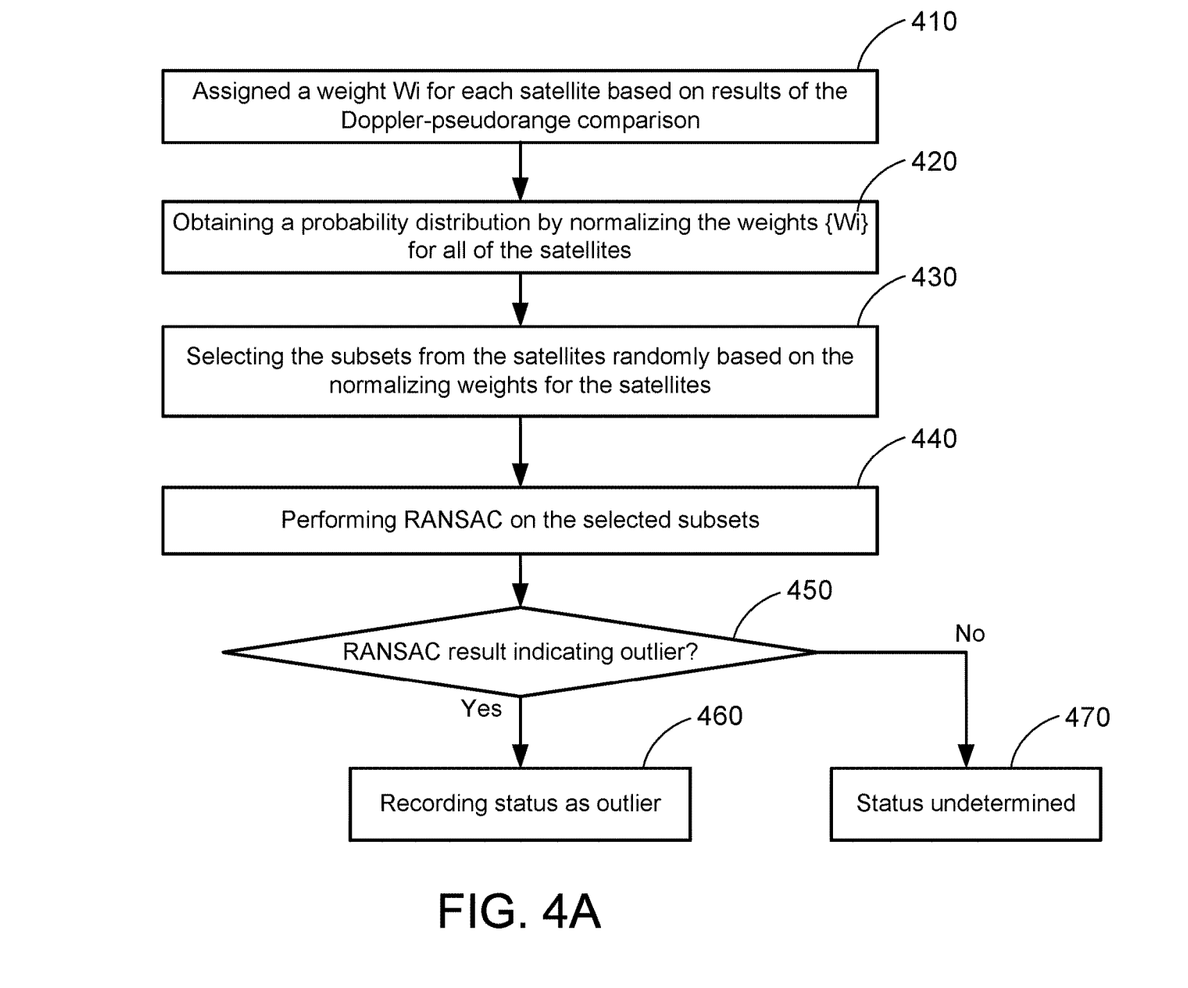
FIG. 4A shows a flowchart of the RANSAC check performed by the RANSAC module as shown in FIG. 2B according to one embodiment of the invention.

FIG. 4A shows a flowchart of the RANSAC check performed by the RANSAC module 270 as shown in FIG. 2B according to one embodiment of the invention. Specifically, FIG. 4A shows the RANSAC checking process performed on all the satellites after the Doppler-pseudorange comparison has been performed. It should be noted that, unless otherwise stated in the present disclosure, the steps of the flowchart as shown in FIG. 4A may be arranged in a different sequential order, and are thus not limited to the sequential order as shown in FIG. 4A.

Figure 4B:
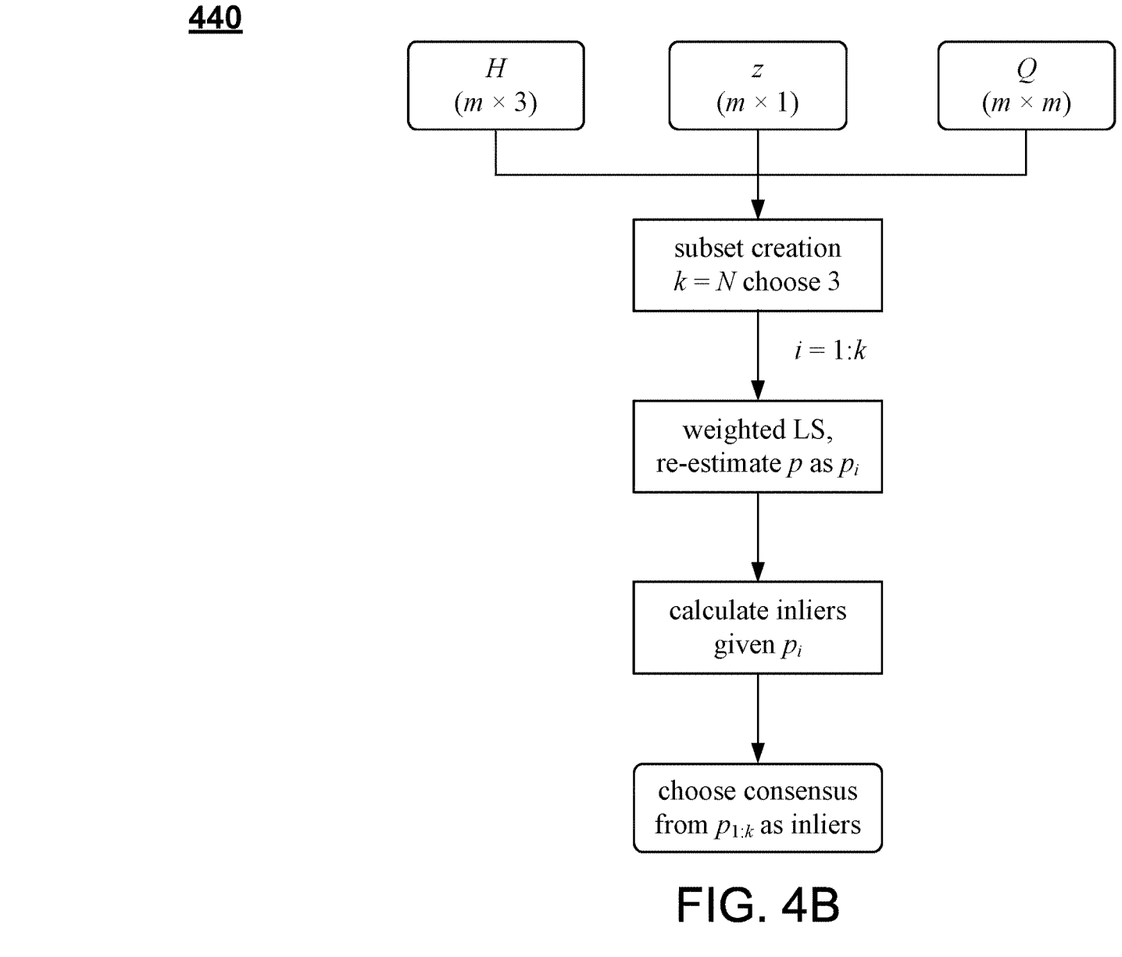
FIG. 4B shows a pipeline flowchart of RANSAC according to one embodiment of the invention.

As shown in FIG. 4A, in the operation of the RANSAC module 270, at the process 410, each satellite is assigned with a weight W based on the results of the Doppler-pseudorange comparison. For example, for each satellite, the weight could be an inverse of the error rate between the Doppler measurement and the pseudorange change rate. Then, at the process 420, a probability distribution can be obtained by normalizing the weights $\{W_i\}$ for all of the satellites. Once the probability distribution is obtained, at process 430, the subsets may be selected from the satellites randomly based on the normalizing weights for the satellites. Thus, the selection result of the subsets would likely be the M most likely inlier sets based on the results of the Doppler-pseudorange comparison. Then, at the process 440, RANSAC is performed on the selected subsets. FIG. 4B shows a pipeline flowchart of RANSAC according to one embodiment of the invention, in which single difference update is used as the RANSAC algorithm for better handling of the reference satellite outlier rejection. However, the RANSAC algorithm being adopted is not limited to the algorithm as shown in FIG. 4B, and other examples of RANSAC algorithms may be adopted. Thus, details of the RANSAC algorithms are not further elaborated herein. At process 450, for each of the subsets, a determination of the RANSAC result is performed. If the result indicates a subset as an outlier, at the process 460, the status of the subset is recorded as an outlier. On the other hand, if the result indicates a subset not as an outlier, it is possible that the subset may be an inlier. At the process 470, the status of the subset remains undetermined, pending further determination by the history-based module 280.

The history-based module 280 is used to perform a history-based check for the satellites/subsets whose status remain undetermined after the Doppler-pseudorange comparison and the RANSAC check have been performed. Specifically, the status of each of the satellites (i.e., as the outlier/inliner) in previous epoch are stored and recorded in the state table 290. Thus, a past time period may be determined such that a final check on the quality of the GNSS observations may be performed using the history recorded status of the satellites/subsets passing the Doppler-pseudorange comparison and the RANSAC check within the past time period. This is to exploit the correlation of outliers across time induced by multipath given the nature of multipath. In one embodiment, the past time period is variable based on a location of the GNSS receiver. For example, when the GNSS receiver is located in an open area with clear sky and no nearby obstacles, the past time period may be shorter (e.g., 1-3 seconds). On the other hand, when the GNSS receiver is located in an area where obstacles exist, the past time period may be longer (e.g., 5-7 seconds). In an alternative embodiment, the past time period may be a fixed time period for all cases.

Once the past time period is determined, for a specific satellite among the satellites/subsets whose status remain undetermined in the Doppler-pseudorange comparison and/or the RANSAC check, the history-based module 280 may check the state table 290 for the specific satellite within the past time period to determine the recorded status of the specific satellite within the past time period, and determine the status of the specific satellite based on the recorded status of the specific satellite within the past time period. If any of the recorded status of the specific satellite within the past time period is the outlier, the status of the specific satellite is determined as the outlier. In other words, a satellite being marked as an outlier will be continuously rejected and maintain the status as the outlier for a period of time (which depends on the past time period). On the other hand, if none of the recorded status of the specific satellite within the past time period is the outlier, the history-based module 280 may determine the status of the specific satellite as the inlier.

Figure 5:
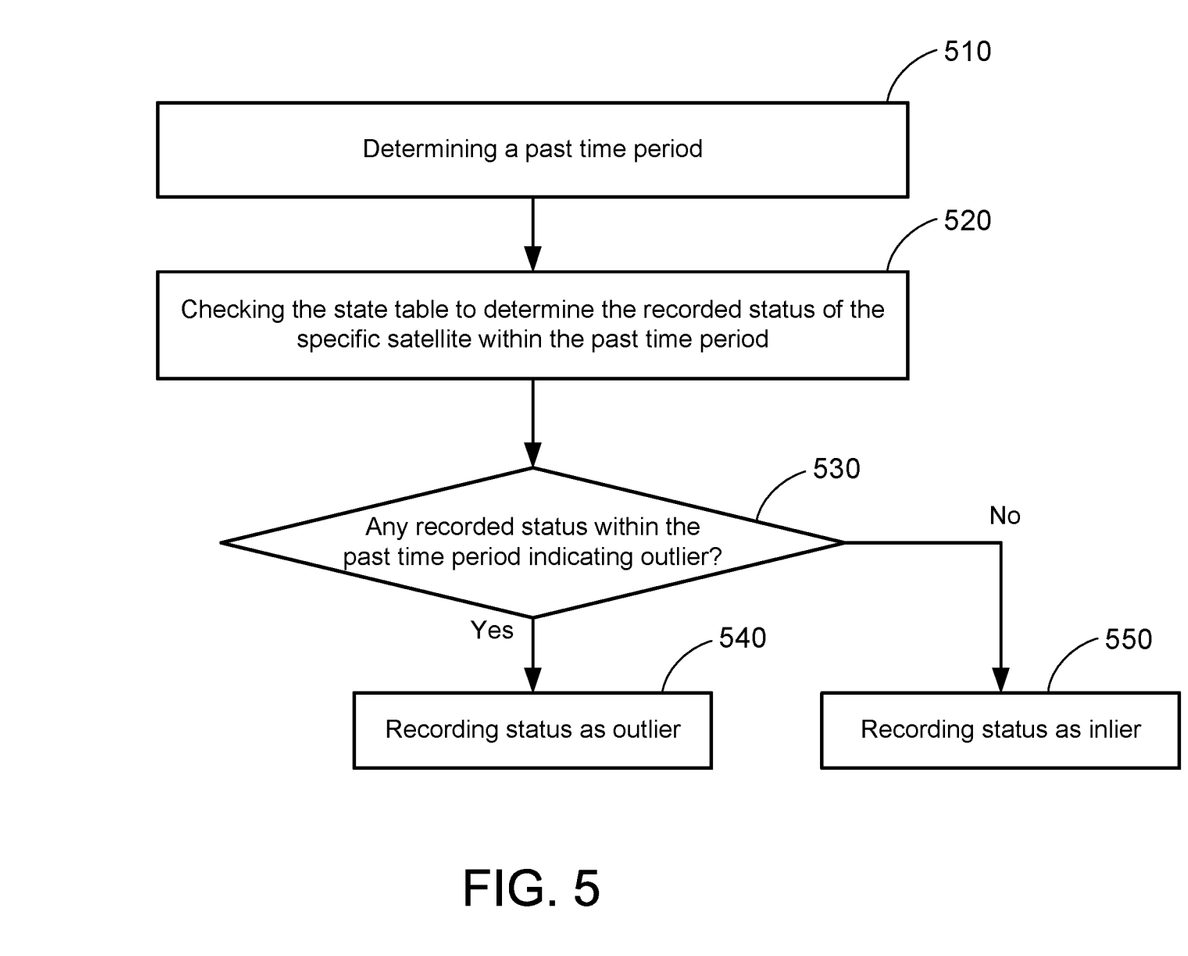
FIG. 5 shows a flowchart of the history-based check performed by the RANSAC module as shown in FIG. 2B according to one embodiment of the invention.

FIG. 5 shows a flowchart of the RANSAC check performed by the history-based module 280 as shown in FIG. 2B according to one embodiment of the invention. Specifically, FIG. 5 shows the history-based checking process performed on the satellites/subsets whose status remain undetermined after the Doppler-pseudorange comparison and the RANSAC check have been performed. It should be noted that, unless otherwise stated in the present disclosure, the steps of the flowchart as shown in FIG. 5 may be arranged in a different sequential order, and are thus not limited to the sequential order as shown in FIG. 5.

As shown in FIG. 5, in the operation of the history-based module 280, at the process 510, a past time period is determined. In certain embodiments, the past time period may be a fixed time period, or may be a variable time period based on the location of the GNSS receiver. At the process 520, for a specific satellite to be checked, the history-based module 280 checks the state table 290 to determine the recorded status of the specific satellite within the past time period. At the process 530, a determination as to whether any of the recorded status for the specific satellite within the past time period indicates the outlier is performed. If the determination indicates a recorded status for the specific satellite within the past time period as the outlier, the current status of the specific satellite is determined as the outlier, and at the process 540, the status of the specific satellite is recorded as the outlier. On the other hand, if the determination indicates no recorded status for the specific satellite within the past time period as the outlier, the current status of the specific satellite is determined as the inlier, and at the process 550, the status of the specific satellite is recorded as the inlier.

Figure 6A:
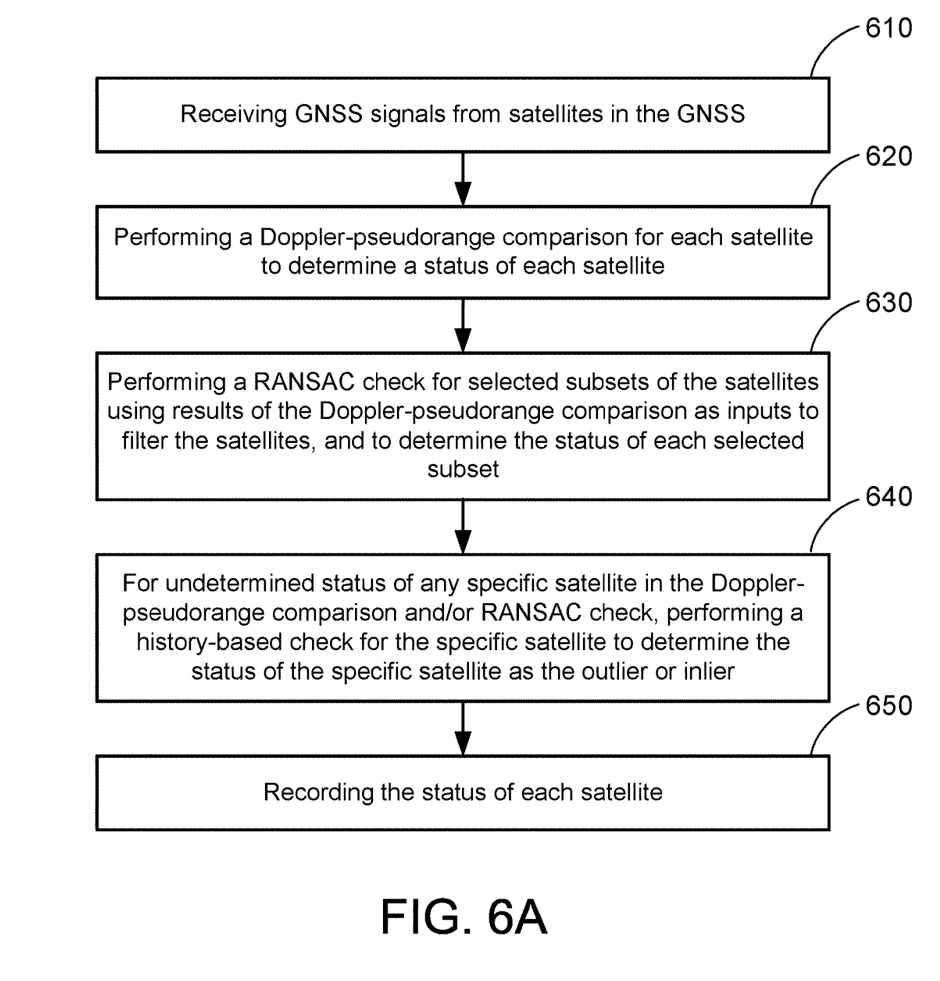
FIG. 6A shows a flowchart of a method for performing GNSS outlier detection and rejection according to one embodiment of the invention.

In another aspect of the present invention, a method for performing GNSS outlier detection and rejection is provided. For example, FIG. 6A shows a flowchart of a method for performing GNSS outlier detection and rejection according to one embodiment of the invention. In certain embodiments, the method as shown in FIG. 6A may be implemented on the GNSS receiver 110 as shown in FIG. 1 and the computing device 200 as shown in FIGS. 2A and 2B. It should be particularly noted that, unless otherwise stated in the present disclosure, the steps of the method may be arranged in a different sequential order, and are thus not limited to the sequential order as shown in FIG. 6A.

As shown in FIG. 6A, at the process 610, the GNSS receiver receives GNSS signals from the satellites in the GNSS, in which the GNSS receiver may process the GNSS signals received to perform positioning. At procedure 620, at the start of the GNSS outlier detection and rejection process, the GNSS receiver performs a Doppler-pseudorange comparison for each of the satellites to determine a status of each of the satellites, either as an outlier or undetermined. In certain embodiments, the details of the Doppler-pseudorange comparison may be referenced in the flowchart as shown in FIG. 3. After performing the Doppler-pseudorange comparison, at the process 630, the GNSS receiver performs the RANSAC check for selected subsets of the satellites using results of the Doppler-pseudorange comparison as inputs to filter the satellites, and to determine the status of each of the selected subsets, either as the outlier or undetermined. In certain embodiments, the details of the RANSAC check may be referenced in the flowchart as shown in FIG. 4A. After performing the RANSAC check, at the process 640, in response to determining the status of a specific satellite as undetermined in the Doppler-pseudorange comparison and/or the RANSAC check, the GNSS receiver performs a history-based check for the specific satellite to determine the status of the specific satellite, either as the outlier or an inlier. In certain embodiments, the details of the history-based check may be referenced in the flowchart as shown in FIG. 5. Whenever the status of one of the satellite is determined, at procedure 650, the GNSS receiver records the status of the satellite in the state table.

Figure 6B:
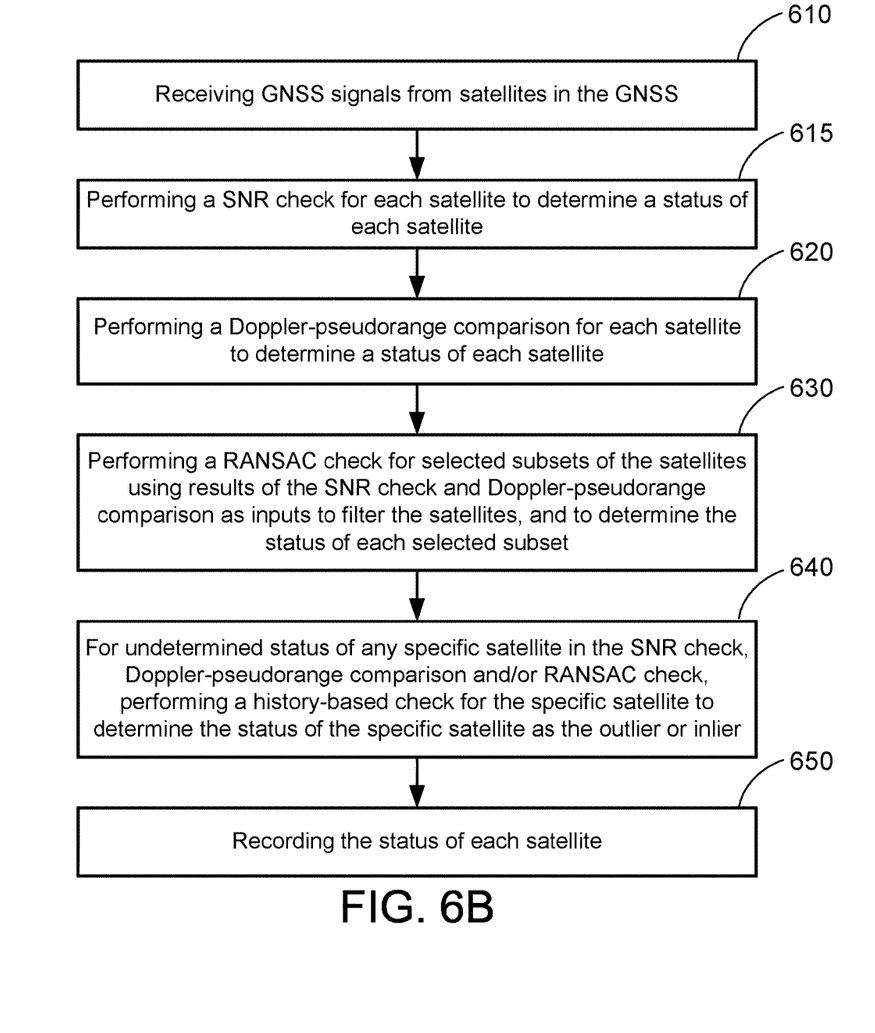
FIG. 6B shows a flowchart of a method for performing GNSS outlier detection and rejection according to an alternative embodiment of the invention.

In certain embodiments, the method as described above may be modified to add additional standard algorithms. For example, FIG. 6B shows a flowchart of a method for performing GNSS outlier detection and rejection according to an alternative embodiment of the invention. In certain embodiments, the method as shown in FIG. 6A may be implemented on the GNSS receiver 110 as shown in FIG. 1 and the computing device 200 as shown in FIGS. 2A and 2B. It should be particularly noted that, unless otherwise stated in the present disclosure, the steps of the method may be arranged in a different sequential order, and are thus not limited to the sequential order as shown in FIG. 6A.

The method as shown in FIG. 6B is different from the method as shown in FIG. 6A with an additional process 615 and some variations in the processes 630 and 640. As shown in FIG. 6B, at the process 610, the GNSS receiver receives GNSS signals from the satellites in the GNSS, in which the GNSS receiver may process the GNSS signals received to perform positioning. At procedure 615, at the start of the GNSS outlier detection and rejection process, the GNSS receiver performs a SNR check for each of the satellites to determine a status of each of the satellites, either as an outlier or undetermined. At procedure 620, at the start of the GNSS outlier detection and rejection process, the GNSS receiver performs a Doppler-pseudorange comparison for each of the satellites to determine a status of each of the satellites, either as an outlier or undetermined. In certain embodiments, the details of the Doppler-pseudorange comparison may be referenced in the flowchart as shown in FIG. 3. It should be note that there is no specific sequence regarding the SNR check and the Doppler-pseudorange comparison. In other words, the SNR check and the Doppler-pseudorange comparison may be performed in any sequence or in parallel. After performing the SNR check and the Doppler-pseudorange comparison, at the process 630, the GNSS receiver performs the RANSAC check for selected subsets of the satellites using results of the SNR check and the Doppler-pseudorange comparison as inputs to filter the satellites, and to determine the status of each of the selected subsets, either as the outlier or undetermined. In certain embodiments, the details of the RANSAC check may be referenced in the flowchart as shown in FIG. 4A. After performing the RANSAC check, at the process 640, in response to determining the status of a specific satellite as undetermined in the SNR check, the Doppler-pseudorange comparison and/or the RANSAC check, the GNSS receiver performs a history-based check for the specific satellite to determine the status of the specific satellite, either as the outlier or an inlier. In certain embodiments, the details of the history-based check may be referenced in the flowchart as shown in FIG. 5. Whenever the status of one of the satellite is determined, at procedure 650, the GNSS receiver records the status of the satellite in the state table.

Yet another aspect of the invention provides a non-transitory tangible computer-readable medium storing instructions which, when executed by one or more processors of the GNSS receiver, cause the above disclosed method for performing GNSS outlier detection and rejection to be performed. The computer executable instructions or program codes enable the above disclosed GNSS receiver or a similar system or apparatus to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

REFERENCE LIST

[1] Castaldo, Gaetano, et al. "P-RANSAC: An Integrity Monitoring Approach for GNSS Signal Degraded Scenario." International Journal of Navigation & Observation (2014).

What is claimed is:

1. A Global Navigation Satellite System (GNSS) receiver for performing GNSS outlier detection and rejection, comprising:
a receiving device communicatively connected to a plurality of satellites in the GNSS, configured to receive GNSS signals from the satellites; and
a computing device having a processor and a storage device storing computer executable instructions, wherein the computer executable instructions, when executed on the processor, cause the processor to:
in response to receiving, by the receiving device, the GNSS signals from the satellites in the GNSS, process the GNSS signals received from the satellites to perform positioning, and perform a Doppler-pseudorange comparison for each of the satellites in the GNSS to determine a status of each of the satellites as an outlier or undetermined;
after performing the Doppler-pseudorange comparison, perform a Random Sampling Consensus (RANSAC) check for selected subsets of the satellites using results of the Doppler-pseudorange comparison as inputs to filter the satellites, and to determine the status of each of the satellites in each of the selected subsets as the outlier or undetermined, wherein each of the selected subsets includes at least one of the satellites;
after performing the RANSAC check, in response to determining the status of a specific satellite of the satellites as undetermined in the Doppler-pseudorange comparison or the RANSAC check, perform a history-based check for the specific satellite to determine the status of the specific satellite as the outlier or an inlier; and record, in a state table, the status of each of the satellites.

2. The GNSS receiver of claim 1, wherein for a designated satellite of the satellites, the Doppler-pseudorange comparison is performed by:
    performing a Doppler measurement based on the GNSS signals received from the specific satellite;
    calculating a pseudorange change rate for the specific satellite; and
    determining the status of the specific satellite by comparing the Doppler measurement and the pseudorange change rate,
    wherein the status of the specific satellite is determined as the outlier when the Doppler measurement and the pseudorange change rate are determined to be inconsistent with each other.

3. The GNSS receiver of claim 2, wherein the Doppler measurement and the pseudorange change rate are determined to be inconsistent when an error rate of the Doppler measurement and the pseudorange change rate exceeds a threshold.

4. The GNSS receiver of claim 2, wherein the RANSAC check is performed by:
    assigning a weight $W_i$ for each the satellites based on the results of the Doppler-pseudorange comparison;
    obtaining a probability distribution by normalizing the weights $\{W_i\}$ for all of the satellites;
    selecting the subsets from the satellites randomly based on the normalizing weights for the satellites; and
    determining, using RANSAC, the status of each of the selected subsets as the outlier or undetermined.

5. The GNSS receiver of claim 4, wherein the weight $W_i$ for each the satellites is determined based on an error rate of the Doppler measurement and the pseudorange change rate.

6. The GNSS receiver of claim 1, wherein the history-based check is performed by:
    determining a past time period for the history-based check;
    checking the state table for the specific satellite within the past time period to determine the recorded status of the specific satellite within the past time period; and
    determining the status of the specific satellite based on the recorded status of the specific satellite within the past time period,
    wherein the status of the specific satellite is determined as the outlier when any of the recorded status of the specific satellite within the past time period is the outlier, and the status of the specific satellite is determined as the inlier when none of the recorded status of the specific satellite within the past time period is the outlier.

7. The GNSS receiver of claim 6, wherein the past time period is variable based on a location of the GNSS receiver.

8. The GNSS receiver of claim 1, wherein the computer executable instructions, when executed on the processor, further cause the processor to, prior to performing the RANSAC check, perform a signal-to-noise ratio (SNR) check for each of the satellites in the GNSS to determine the status of each of the satellites as the outlier or undetermined, wherein the RANSAC check uses both the results of the Doppler-pseudorange comparison and results of the SNR check as the inputs to filter the satellites.

9. A vehicle having the GNSS receiver of claim 1.

10. A method for performing Global Navigation Satellite System (GNSS) outlier detection and rejection, comprising:
    providing a GNSS receiver communicatively connected to a plurality of satellites in the GNSS, wherein the GNSS receiver is configured to receive GNSS signals from the satellites and process the GNSS signals to perform positioning;
    in response to receiving, by the GNSS receiver, the GNSS signals from the satellites in the GNSS, processing, by the GNSS receiver, the GNSS signals received from the satellites to perform positioning, and performing, by the GNSS receiver, a Doppler-pseudorange comparison for each of the satellites in the GNSS to determine a status of each of the satellites as an outlier or undetermined;
    after performing the Doppler-pseudorange comparison, performing, by the GNSS receiver, a Random Sampling Consensus (RANSAC) check for selected subsets of the satellites using results of the Doppler-pseudorange comparison as inputs to filter the satellites, and to determine the status of each of the satellites in each of the selected subsets as the outlier or undetermined, wherein each of the selected subsets includes at least one of the satellites;
    after performing the RANSAC check, in response to determining the status of a specific satellite of the satellites as undetermined in the Doppler-pseudorange comparison or the RANSAC check, performing, by the GNSS receiver, a history-based check for the specific satellite to determine the status of the specific satellite as the outlier or an inlier; and
    recording, by the GNSS receiver in a state table, the status of each of the satellites.

11. The method of claim 10, wherein for a designated satellite of the satellites, the Doppler-pseudorange comparison is performed by:
    performing a Doppler measurement based on the GNSS signals received from the designated satellite;
    calculating a pseudorange change rate for the designated satellite; and
    determining the status of the designated satellite by comparing the Doppler measurement and the pseudorange change rate,
    wherein the status of the designated satellite is determined as the outlier when the Doppler measurement and the pseudorange change rate are determined to be inconsistent with each other, and the Doppler measurement and the pseudorange change rate are determined to be inconsistent when an error rate of the Doppler measurement and the pseudorange change rate exceeds a threshold.

12. The method of claim 11, wherein the RANSAC check is performed by:
    assigning a weight $W_i$ for each the satellites based on the results of the Doppler-pseudorange comparison, wherein the weight $W_i$ for each the satellites is determined based on an error rate of the Doppler measurement and the pseudorange change rate;
    obtaining a probability distribution by normalizing the weights $\{W_i\}$ for all of the satellites;
    selecting the subsets from the satellites randomly based on the normalizing weights for the satellites; and
    determining, using RANSAC, the status of each of the selected subsets as the outlier or undetermined.

13. The method of claim 10, wherein the history-based check is performed by:
    determining a past time period for the history-based check;
    checking the state table for the specific satellite within the past time period to determine the recorded status of the specific satellite within the past time period; and determining the status of the specific satellite based on the recorded status of the specific satellite within the past time period, wherein the status of the specific satellite is determined as the outlier when any of the recorded status of the specific satellite within the past time period is the outlier, and the status of the specific satellite is determined as the inlier when none of the recorded status of the specific satellite within the past time period is the outlier.

14. The method of claim 13, wherein the past time period is variable based on a location of the GNSS receiver.

15. The method of claim 10, further comprising:

prior to performing the RANSAC check, performing, by the GNSS receiver, a signal-to-noise ratio (SNR) check for each of the satellites in the GNSS to determine the status of each of the satellites as the outlier or undetermined, wherein the RANSAC check uses both the results of the Doppler-pseudorange comparison and results of the SNR check as the inputs to filter the satellites.

16. A non-transitory tangible computer-readable medium storing computer executable instructions which, when executed by one or more processors on a Global Navigation Satellite System (GNSS) receiver, cause a method for performing GNSS outlier detection and rejection to be performed, the method comprising:

in response to receiving, by the GNSS receiver, GNSS signals from the satellites in the GNSS, processing, by the GNSS receiver, the GNSS signals received from the satellites to perform positioning, and performing, by the GNSS receiver, a Doppler-pseudorange comparison for each of the satellites in the GNSS to determine a status of each of the satellites as an outlier or undetermined;

after performing the Doppler-pseudorange comparison, performing, by the GNSS receiver, a Random Sampling Consensus (RANSAC) check for selected subsets of the satellites using results of the Doppler-pseudorange comparison as inputs to filter the satellites, and to determine the status of each of the satellites in each of the selected subsets as the outlier or undetermined, wherein each of the selected subsets includes at least one of the satellites;

after performing the RANSAC check, in response to determining the status of a specific satellite of the satellites as undetermined in the Doppler-pseudorange comparison or the RANSAC check, performing, by the GNSS receiver, a history-based check for the specific satellite to determine the status of the specific satellite as the outlier or an inlier; and recording, by the GNSS receiver in a state table, the status of each of the satellites.

17. The non-transitory tangible computer-readable medium of claim 16, wherein for a designated satellite of the satellites, the Doppler-pseudorange comparison is performed by:

performing a Doppler measurement based on the GNSS signals received from the specific satellite;

calculating a pseudorange change rate for the specific satellite; and determining the status of the specific satellite by comparing the Doppler measurement and the pseudorange change rate, wherein the status of the specific satellite is determined as the outlier when the Doppler measurement and the pseudorange change rate are determined to be inconsistent with each other, and the Doppler measurement and the pseudorange change rate are determined to be inconsistent when an error rate of the Doppler measurement and the pseudorange change rate exceeds a threshold.

18. The non-transitory tangible computer-readable medium of claim 17, wherein the RANSAC check is performed by:

assigning a weight $W_i$ for each the satellites based on the results of the Doppler-pseudorange comparison, wherein the weight $W_i$ for each the satellites is determined based on an error rate of the Doppler measurement and the pseudorange change rate;

obtaining a probability distribution by normalizing the weights $\{W_i\}$ for all of the satellites;

selecting the subsets from the satellites randomly based on the normalizing weights for the satellites; and determining, using RANSAC, the status of each of the selected subsets as the outlier or undetermined.

19. The non-transitory tangible computer-readable medium of claim 16, wherein the history-based check is performed by:

determining a past time period for the history-based check;

checking the state table for the specific satellite within the past time period to determine the recorded status of the specific satellite within the past time period; and determining the status of the specific satellite based on the recorded status of the specific satellite within the past time period, wherein the status of the specific satellite is determined as the outlier when any of the recorded status of the specific satellite within the past time period is the outlier, and the status of the specific satellite is determined as the inlier when none of the recorded status of the specific satellite within the past time period is the outlier.

20. The non-transitory tangible computer-readable medium of claim 19, wherein the past time period is variable based on a location of the GNSS receiver.

* * * * *